(12) United States Patent
Bodin

(10) Patent No.: US 8,333,227 B2
(45) Date of Patent: Dec. 18, 2012

(54) TREAD DESIGN FOR HEAVY-LOAD TRANSPORT VEHICLES

(75) Inventor: Jean-Matthieu Bodin, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 696 days.

(21) Appl. No.: 12/376,961

(22) PCT Filed: Jul. 13, 2007

(86) PCT No.: PCT/EP2007/057254
§ 371 (c)(1),
(2), (4) Date: Feb. 9, 2009

(87) PCT Pub. No.: WO2008/017569
PCT Pub. Date: Feb. 14, 2008

(65) Prior Publication Data
US 2010/0163146 A1    Jul. 1, 2010

(30) Foreign Application Priority Data
Aug. 8, 2006  (FR) ...................... 06 07268

(51) Int. Cl.
*B60C 11/00* (2006.01)
*B60C 11/11* (2006.01)
(52) U.S. Cl. .............. 152/209.8; 152/209.12; 156/110.1
(58) Field of Classification Search ............... 152/209.8, 152/209.12, 209.13; 156/110.1
See application file for complete search history.

(56) References Cited

U.S. PATENT DOCUMENTS

| 4,412,575 | A | * | 11/1983 | Maeda et al. | ............ 152/209.22 |
| 4,649,976 | A |   | 3/1987 | Cherveny et al. | |
| 4,711,283 | A | * | 12/1987 | Bonko et al. | ............ 152/209.12 |
| 4,732,194 | A | * | 3/1988 | Saneto et al. | ............ 152/209.8 |
| 4,982,775 | A | * | 1/1991 | Matsumoto | ................ 152/209.1 |
| 5,152,852 | A | * | 10/1992 | Hisamichi et al. | ........ 152/209.8 |
| 5,385,187 | A |   | 1/1995 | Kajiwara et al. | |
| 5,464,050 | A | * | 11/1995 | Bonko | ...................... 152/209.12 |
| 6,209,602 | B1 | * | 4/2001 | Bonko | ...................... 152/209.12 |
| 6,263,933 | B1 |   | 7/2001 | Baus | |
| 6,443,199 | B1 | * | 9/2002 | Scarpitti et al. | ............ 152/209.1 |

FOREIGN PATENT DOCUMENTS

DE     35 22 967     1/1987
(Continued)

*Primary Examiner* — Steven D Maki
*Assistant Examiner* — Robert Dye
(74) *Attorney, Agent, or Firm* — Cozen O'Connor

(57) ABSTRACT

A tire tread intended to be fitted on heavy vehicles, comprising a plurality of elements in relief (30), this tread being divided in the axial direction into three parts, a central part (33) and axially on either side a first edge (31) and a second edge (32), the first and the second edge parts comprising elements in relief (30) arranged at a pitch Pe corresponding to the average circumference of the edge in question divided by the number of elements in relief on the edge in question, the elements in relief of each edge part having a line of leading ridges and a line of trailing ridges. The lines of ridges (312, 322) of the elements in relief of the first edge part (31) have profiles which cannot be superposed on the profiles of the lines of ridges (321, 322) of the elements in relief of the second edge part (32), and the difference between the absolute value of the angle of the average direction of each line of ridges (311, 312) of an element in relief of the first edge part and each of the absolute values of the angles of the average directions of the lines of ridges (321, 322) of each element in relief of the second edge part is at least equal to 10 degrees and at most equal to 20 degrees.

3 Claims, 3 Drawing Sheets

FOREIGN PATENT DOCUMENTS

| | | | |
|---|---|---|---|
| EP | 3815829 | * | 12/1988 |
| EP | 0698511 | * | 2/1996 |
| EP | 1 120 294 | | 8/2001 |
| FR | 2 411 094 | | 7/1979 |
| JP | 07 052611 | | 2/1995 |
| WO | WO 01/39994 | | 6/2001 |

* cited by examiner

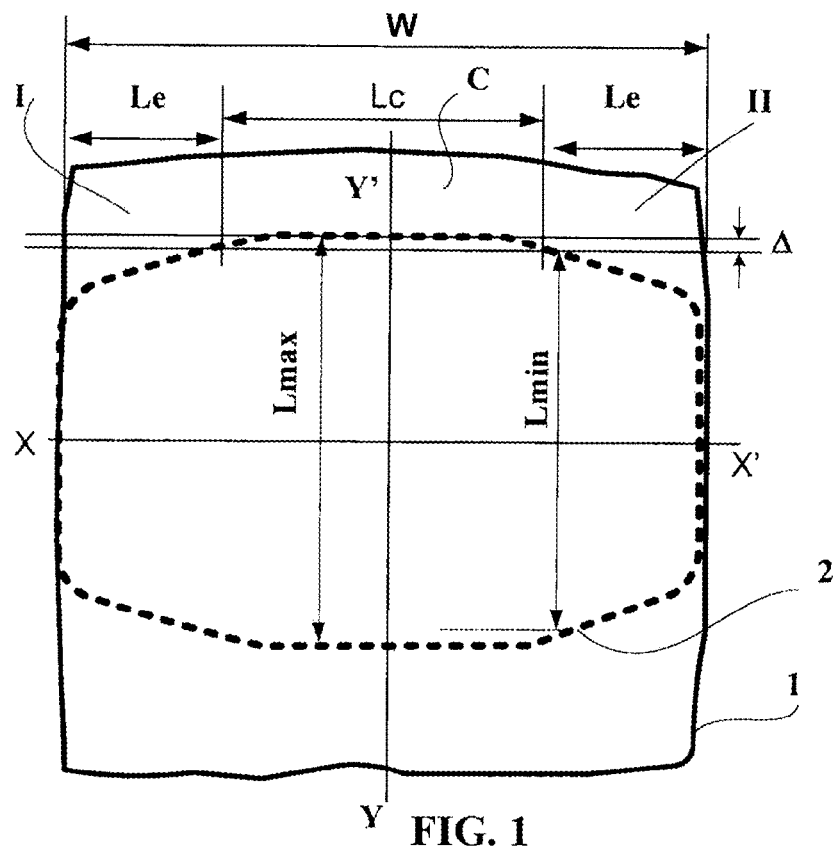
FIG. 1
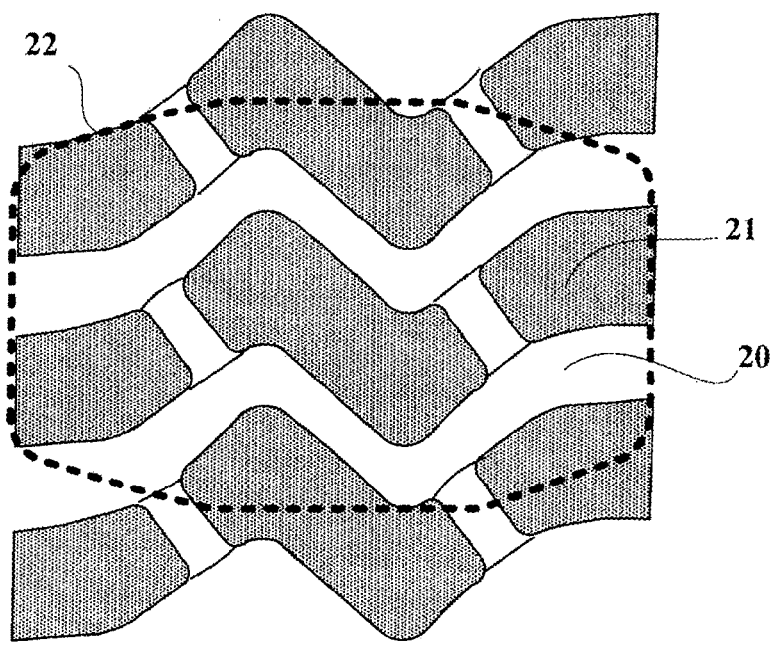
FIG. 2  "Prior Art"

TREAD DESIGN FOR HEAVY-LOAD TRANSPORT VEHICLES

This is a U.S. National Phase Application under 35 USC 371 of International Application PCT/EP2007/057254,filed on Jul. 13, 2007.

The application claims the priority of French patent application no. 06/07268 filed Aug. 8, 2006, the suject matter of which is hereby incorporated reference.

FIELD OF THE INVENTION

The invention relates to tires for vehicles for transporting heavy loads; this invention relates more particularly to the tread of such tires.

BACKGROUND OF THE INVENTION

For vehicles for working mines or quarries, or for use on construction sites, such as loaders, dumpers or scrapers, it is known that the loads borne by each tire vary substantially according to the conditions of use since these vehicles travel at times with a light load ("empty") and at times with a full load ("full load"). In such cases, the variations in load on the tires may be from 40% to 80% of the rated load defined for the dimension in question by E.T.R.T.O. (The European Tire and Rim Technical Organisation) Standards.

These two extreme conditions of use result in forms of contact patch of the tire with the roadway which are also very variable since it is possible to change from a substantially rectangular overall form to a form which is no longer substantially rectangular. In this latter case, the contact patch has a rectangular median part extended axially on either side by substantially trapezoidal forms (see FIG. 1).

It has been noted that these variations in contact geometries combined with the elements in relief of the tread result in the occurrence of vibrations during rolling of the tire. This is because the ridges of the tread pattern elements may have orientations close to or identical to the orientation of the ends of the contact patches on the edges.

In order to reduce this drawback, means have been sought time and again in the prior art to limit the variations in contact patch geometry under different load conditions.

SUMMARY OF THE INVENTION

One object of the invention is to provide a tread, the arrangement and the geometry of the motifs in relief of which make it possible to solve the problem mentioned, namely obtaining a significant reduction in the vibrations during travel within the entire range of loads which may be borne by a tire, despite the variations in geometry of the contact patch.

According to an embodiment of the invention, the tread of a tire for vehicles for transporting heavy loads comprises a plurality of elements in relief, this tread being divided in the axial direction into three parts, a central part and axially on either side a first edge part and a second edge part.

The central part of the tread has a width Lc which is determined as the region of the tread the contact patch of which has, between the maximum length of contact and the minimum length of contact, a difference at most equal to 0.5% of the total width W of the contact patch (in a load condition equal to 0.40 times the E.T.R.T.O. rated load and at E.T.R.T.O. rated pressure).

The first and second edge parts comprise elements in relief arranged at a pitch Pe equal to the average circumference of the edge in question divided by the number of elements in relief on the edge in question, the average circumference being measured on the median part of said edge at the radially outermost point when the tire is mounted on its rated rim and inflated to its rated pressure, the elements in relief of each edge part having a line of leading ridges and a line of trailing ridges.

This tread of the tire is characterised in that the lines of ridges of the elements in relief of the first edge part have profiles which cannot be superposed on the profiles of the lines of ridges of the elements in relief of the second edge part, be it by central symmetry in the case of a non-directional tread or by axial symmetry in the case of a directional tread, and in that the difference between the absolute value of the angle of the average direction of each line of ridges of an element in relief of the first edge part and each of the absolute values of the angles of the average directions of the lines of ridges of each element in relief of the second edge part is at least equal to 10 degrees and at most equal to 20 degrees.

Furthermore, the total contact surface of the elements in relief of the edge parts in a window of a width equal to the width W of the tread (equal to the width of the contact patch) of circumferential length equal to the pitch Pe of the elements in relief of the edge parts is constant or virtually constant (the relative deviation between the minimum value and the maximum value of the total surface on the ground is at most 5%), this total contact surface of the elements in relief being equal to the total of the contact surfaces of the elements in relief of the first and second edge parts.

A tread is said to be non-directional when the design of the elements in relief in a plan view does not imply a preferred direction of travel (for example an overall S-shaped motif as in FIG. 3). A tread is said to be directional if the design of the elements in relief in a plan view implies a preferred direction of travel (for example the general V-shaped motif).

It is preferred that the following relationship be satisfied on each edge part:

$$Be = \mathrm{Arctan}\left(\frac{Le}{Pe}\right)$$

where Be is the average angle of the ridges of the elements in relief of the part in question, Pe is the pitch of said elements and Le is the total width in longitudinal projection on the transverse axis of the elements in relief of said part.

To differentiate the angles of the ridges of the elements of one edge part from the ridges of the elements of another edge part, it is advisable for the angles of the ridges of the elements in relief of one edge part to be equal to or greater than this angle Be by a quantity α (alpha) which may adopt any value between 0 and 20 degrees, whereas the angles of the ridges of the elements in relief of the other edge part are equal to or smaller than this angle Be by a quantity β (beta) which may adopt any value between 0 and 20 degrees. The total of the absolute values of these angles α (alpha) and β (beta) must be at least equal to 10 degrees and at most equal to 20 degrees.

If the total of the angles is less than 10 degrees, the asymmetry between the elements in relief of one edge part and the other is not sufficient to have a significant effect on the vibrations linked to certain forms of contact patch. If the total of the angles is greater than 20 degrees, then at full load the elements in relief of the edge parts will start generating vibrations again.

It is advantageous for the contact surface of the motifs in relief of said central part passing through a window of length equal to the pitch Pc to be constant (that is to say that the relative deviation between the minimum value and the maximum value of the total surface on the ground is at most 5%) on the central part, comprising a plurality of elements in relief distributed in the circumferential direction with a pitch Pc equal to the circumference measured at the centre of the tire (radially outermost point) divided by the total number of motifs in relief.

With a tread according to the invention, it is thus possible to avoid as far as possible the ridges of the motifs in relief on each edge shoulder coinciding when entering into and emerging from contact.

Another aspect of the invention is directed to a method for constructing the pattern of the elements in relief of a tire tread for construction machinery which makes it possible substantially to reduce the vibrations of the vehicle during travel, said vibrations being to a great extent linked to the great range of variation of load in use, this method comprising the following steps:

defining a central part of axial width Lc of the tread on which is arranged in the longitudinal direction a plurality of elements in relief with a pitch Pc, these elements in relief being separated from each other by grooves, each of these elements in relief having lines of leading and trailing ridges which are inclined with the longitudinal direction of the tread by an angle Ac such that the relationship below is satisfied:

$$Ac = \text{Arctan}\left(\frac{Lc}{Pc}\right)$$

in each of the edge parts axially on either side of the central part, there is arranged a plurality of elements in relief with a pitch Pe, these elements in relief being separated from each other by grooves, each of these elements in relief having lines of leading and trailing ridges which are inclined with the longitudinal direction of the tread by an angle De for one edge part and Ce for another edge part, so that the following relationships are satisfied:

$$De = \text{Arctan}\left(\frac{Le}{Pe}\right) + \alpha$$

$$Ce = \text{Arctan}\left(\frac{Le}{Pe}\right) + \beta,$$

the values α (alpha) and β (beta) being selected between −20 degrees and +20 degrees (including limits), and such that the total of the absolute values of said angles α and β is at least equal to 10 degrees and at most equal to 20 degrees.

BRIEF DESCRIPTION OF THE DRAWING

Other characteristics and advantages of the invention will become apparent from the description given hereafter with reference to the appended drawings, which depict, by way of non-limitative examples, forms of embodiment of the subject of the invention.

FIG. 1 shows the contours of the contact patches of a tire at rated load (unbroken lines) and at 80% of its rated load (broken lines);

FIG. 2 shows a plan view of the elements in relief of a tread according to the prior art;

DETAILED DESCRIPTION OF THE DRAWINGS

Figure 3A:
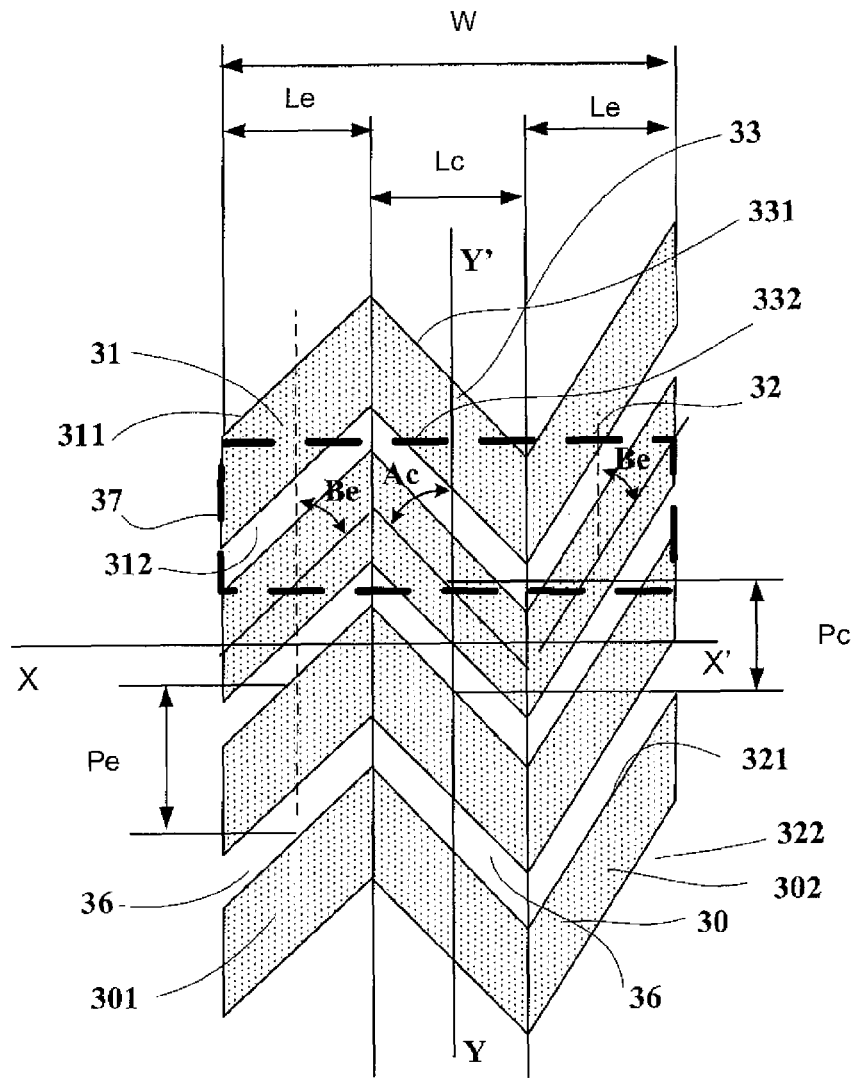
FIG. 3A shows a plan view of the elements in relief of a variant of a tread according to the invention.

FIG. 1 shows the superposed contours 1, 2 of the contact patch of a tire of dimension 26.5 R 25 inflated to a pressure of 4.5 bar and bearing loads equal to 80% and 40% of a rated load as defined for this dimension of tire by the 2006 E.T.R.T.O. Standards. This rated load in the present case is equal to 15,000 kg. The unbroken-line trace 1 corresponds to a load of 12,000 kg, equal to 80% of this rated load (full load condition), whereas the broken-line trace 2 corresponds to a load of 6,000 kg, or 40% of the rated load (empty condition). When used on works machinery such as loaders, dumpers or scrapers, it will be noted that the tires of these vehicles operate for part of the time at full load and for another part substantially empty. The full load phases alternate with the empty phases.

These two load conditions are fully representative of the actual conditions of use.

In this FIG. 1, it will be noted that there is a central part C of width Lc for which the limits of the contour of the contact patch when entering into and emerging from contact are substantially parallel to the axis XX' (axis parallel to the axis of rotation of the tire). This width Lc (equal to 200 mm for the example described) corresponds to the width of the median region for which the lengths of contact patch measured in a longitudinal direction perpendicular to the direction XX' vary by less than 0.5% of the width W (equal to 580 mm) of the contact patch in full load condition. In this FIG. 1, the difference Δ between the maximum length Lmax and the minimum length Lmin is less than 0.5 percent of the width W of the contact patch.

On each edge part I, II, located axially to the outside of the central part previously defined, the form of the contour of the contact patch varies substantially, the geometric forms more approximating a trapezium (empty condition) than a rectangle (full load condition). The width Le of each edge part is, in the present case, equal to 190 mm.

FIG. 2 depicts the contact patch of the elements in relief 21 for a tire according to the prior art, said tire being subject to a load of 80% of the rated load. On this contact patch there is superposed the contour of the contact patch in the load condition 40% of the rated load (broken-line trace): it will be noted that on the edges of the contact patch, some of the ridges 22 of the elements in relief coincide with the limits of the contour of the contact patch. According to this prior art, the elements in relief of one edge part can be geometrically superposed on the elements in relief of the other edge part by central symmetry. In this case, the design of the tread pattern is non-directional (that is to say that there is no preferred direction of travel).

A first tread pattern variant of a tread according to the invention is shown in plan view in FIG. 3A. This tread, intended for a tire of dimension 26.5 R 25, comprises a plurality of elements in relief 30 extending continuously and overall in the transverse direction (XX'), this transverse direction being parallel to the direction of the axis of rotation of the tire. The elements in relief 30 are separated from each other in the longitudinal direction (YY') (or circumferential direction on the tire) by zigzag grooves 36 of transverse general orientation.

Over a central part 33 of width Lc equal to 200 mm, each element in relief 30 comprises rectilinear ridges 331, 332 which are parallel to each other and form an angle Ac with the longitudinal direction. The ridges of the elements in relief of the central part have a width projected on the transverse axis equal to the width Lc of said part. Over this central part, the difference in the maximum and minimum lengths of contact patch for the conditions at full load and when empty (values given previously for the description of FIG. 1) is less than 0.5 percent of the width of the tread, or 2.9 mm (0.5 percent of 580 mm).

The pitch Pc between two consecutive elements in the central part is equal to the average circumference of each shoulder divided by the total number of motifs in relief. The angle Ac is such that it satisfies the following formula:

$$Pc = \frac{Lc}{tgAc}$$

In the example shown, the pitch Pc is equal to 208.4 mm and the angle Ac is therefore equal to 43.9 degrees (angle measured relative to the longitudinal direction).

On either side of the central part, there is a first edge part 31 (axially on the left-hand side of the figure) and a second edge part 32 (axially on the right-hand side of the figure), these two parts having one and the same width Le equal to 190 mm.

For each edge part 31, 32, there is defined an average angle Be of the elements in relief 301, 302 respectively, such that $$Pe = \frac{Le}{tgBe},$$

knowing that Pe, the pitch of the motifs in relief on each edge part, is equal to the average circumference of each edge part divided by the total number of motifs in relief. The average circumference of an edge is measured in the middle of each edge part. The angle Be here is equal to 42.45 degrees.

On the first edge part 31, the elements in relief 301 (corresponding to the part of the element in relief 30 located in this edge part) have on the running surface (that is to say, on the outer surface of the tread intended to come into contact with the roadway during travel) the form of a parallelogram, and are arranged at a pitch Pe equal to 207.7 mm. The arrangement of the elements in relief on this first edge part is such that, relative to a virtual line passing through the point of intersection of the lines of leading ridges of an element of said edge part and of the element of the central part which extends it axially, said elements (element of the edge part and element of the central part) are located on the same side.

Each element in relief 301 of the first edge part comprises a rectilinear leading ridge 311 and a rectilinear trailing ridge 312, these ridges forming an angle De equal to 46.9 degrees with the longitudinal direction. This angle De of the ridges 311, 312 is equal to the angle Be to which is added an angle alpha of between 0 and 20 degrees (in the present case 4.45 degrees). The leading ridge of an element in relief corresponds to the first ridge of said element in relief to enter into the contact patch when the tire is rolling. The trailing ridge corresponds to the last ridge of the element in relief to emerge from the contact patch.

Figure 3B:
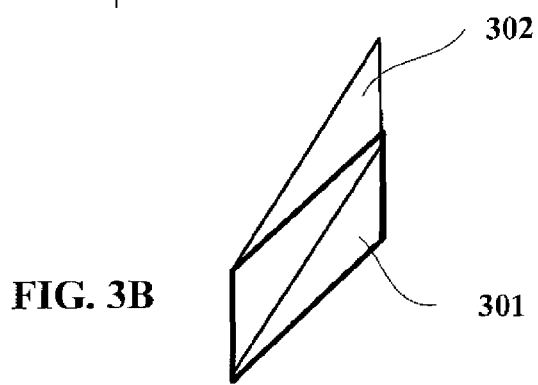
FIG. 3B shows the superposition of two elements in relief of the tread shown in FIG. 3A.

The second edge part 32 comprises a plurality of elements in relief 302 (corresponding to the part of the element in relief 30 located in this edge part) the outer surface of which is in the form of a parallelogram. The pitch of the elements 302 of this second part 32 is identical to that of the elements of the first part, or 207.7 mm. The leading and trailing ridges 321, 322 of each element in relief 302 of the second edge part form an angle Ce equal to the angle Be reduced by an angle beta of between 0 and 20 degrees (in the present case 7.88 degrees). The orientation for the elements in relief 302 of this second part is such that said elements in relief form a V with the part of the element in relief located in the central part. The elements in relief 302 of the second edge part 32 are substantially oriented in the same direction as the elements in relief 301 of the first edge part 31, without however the leading and trailing ridges of the elements of one edge part being able to be superposed on the ridges of the elements of the other edge part as shown in FIG. 3B. In FIG. 3B, the elements in relief 301, 302 respectively of the first and of the second edge parts are compared after the element 301 has been subjected to central symmetry: it can clearly be seen that these two elements in relief have distinct geometries. This makes it possible to ensure that there will be a reduced number of coinciding geometries of the ridges and the contour of the contact patch, be it at full load or empty.

Furthermore, the total of the absolute values of the angles $\alpha$ (alpha) and $\beta$ (beta) is preferably between 10 and 20 degrees, in order to generate an appropriate asymmetry between the two edge parts. In the present case, this total is equal to 12.33 degrees. In this manner, each line of ridges 311, 312 of the elements in relief of the first edge part 31 cannot be superposed on the lines of ridges 321, 322 of the elements in relief of the second edge part 32.

The relationships thus fixed for the edge parts make it possible to ensure that a substantially constant quantity of material comes into contact with the ground, the total surface of contact of the elements in relief of the edge parts passing into a virtual window 37 of a width equal to the width W of the tread and of a circumferential length equal to the pitch Pe of the elements in relief of the edges being constant or virtually constant. "Constant or virtually constant" is understood to mean that the maximum amplitude of the variation of the total surface is at most 5% of the maximum value of said total surface. The total contact surface of the motifs in relief is equal to the total of the surfaces of the motifs in relief of the first and second edge parts and of the central part. Thus it is possible to maintain a virtually unchanged rigidity of the part of the tread in contact with the ground during travel of the tire, while preventing a large number of ridges of the elements in relief of the edge parts from coinciding with the contours of the contact patch, be it at full load or empty.

In the case which has been described with the support of FIGS. 3A and 3B, the elements in relief have leading and trailing ridges which are parallel on each of the edges. As a variant, not shown, provision may be made for the leading ridge of each element in relief to form an angle which is different from the angle of the trailing ridge of said element, knowing that these angles are determined starting from the average angle Be of the element in relief as defined previously by the relationship between the width of the edge part and the pitch:

$$Pe = \frac{Le}{tgBe}$$

Of course, it is essential, in the event that the angles of the leading and trailing ridges of one and the same element in relief are not equal, to satisfy the condition according to which the total surface of contact passing into a virtual window of a width equal to the width of the tread and of a length equal to the pitch of the elements in relief must be constant.

Figure 4A:
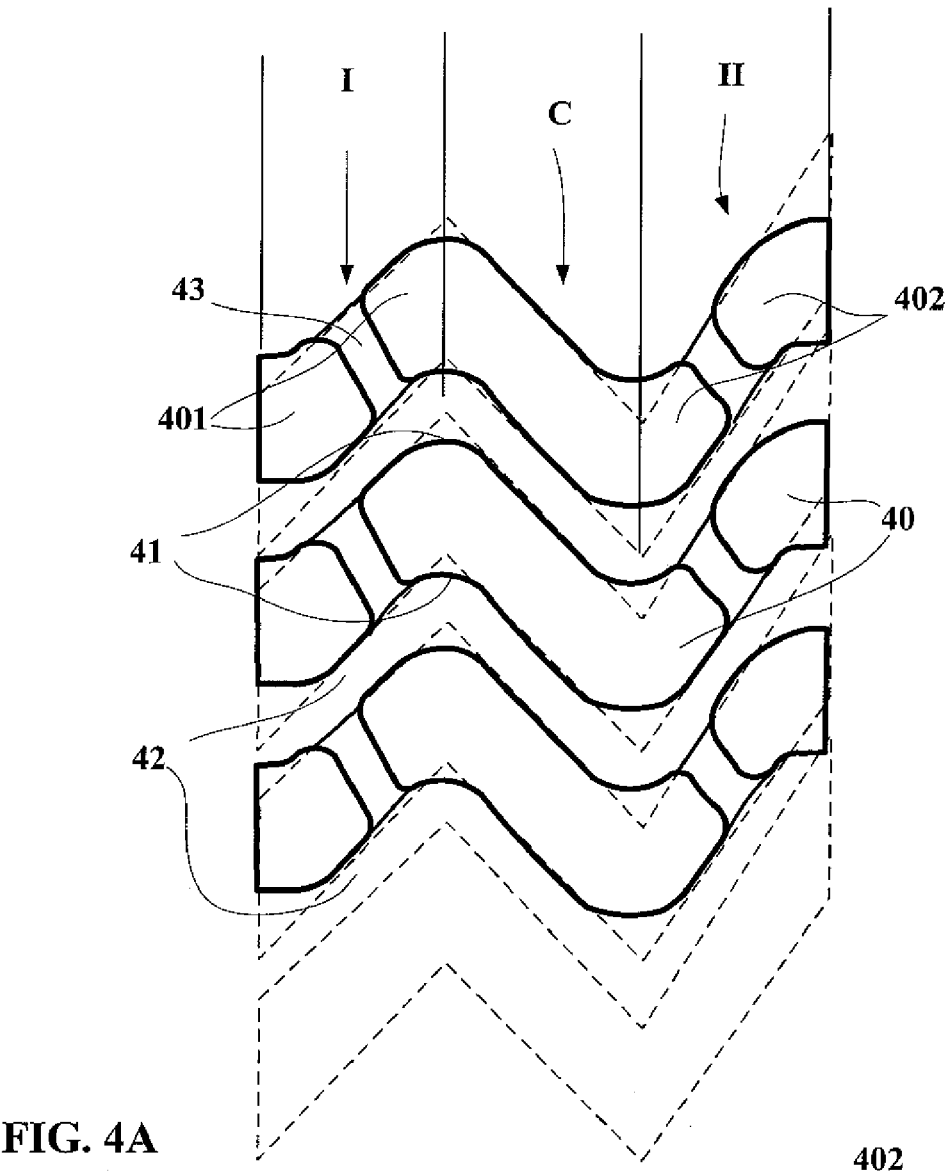
FIG. 4A shows a variant of a tread according to the invention constructed from the variant of FIG. 3A.
Figure 4B:
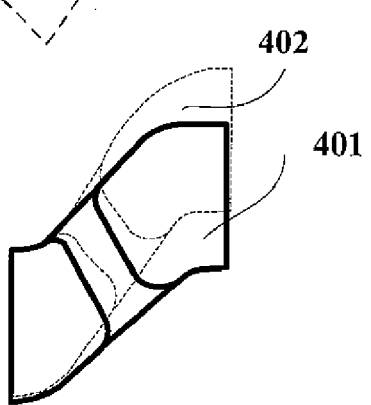
FIG. 4B shows the superposition of two elements in relief of the tread shown in FIG. 4A.

In another variant, represented in FIGS. 4A and 4B, the ridges of the elements in relief may be of non-rectilinear orientations. In this case an average direction of a line of ridges of a block is defined by the average line of linear regression of the line of ridges (least-squares line).

As shown in FIG. 4A, the design of the elements in relief 40 has been adapted, from the trace of the elements in relief of FIG. 3 (in broken lines in FIG. 4), to take account of constraints linked to the other types of performance required in use. In particular, the points 41 of said elements in relief have been rounded in order to obtain regular wear forms and a reduction in the rate of wear. In this example, of a tread for a tire of dimension 26.5 R 25, the angle Ac is again 43.9 degrees, and the angle Be is 42.45 degrees. Furthermore, grooves 43 of low depth have been produced on each edge part.

For the first edge part I, the elements in relief 401 represent part of the elements 40; the line of leading ridges and the line of trailing ridges each comprise two separate lines, the average direction of which forms an angle of 46.9 degrees with the longitudinal direction (in broken lines, trace of the geometry of the elements in relief of FIG. 3). It is in addition advantageous to provide an angular separation of several degrees between the leading ridge and the trailing ridge of one and the same element.

For the second edge part II, the elements in relief 401 represent part of the elements 40; the line of leading ridges and the line of trailing ridges each comprise two separate lines, the average direction of which forms an angle of 34.6 degrees with the longitudinal direction. Just as for the first edge part, it is in addition advantageous to provide an angular separation of several degrees between the leading ridge and the trailing ridge of one and the same element.

In FIG. 4B, the parts of elements in relief 401, 402 of each edge part have been superposed: it can clearly be seen that these two elements in relief have distinct geometries.

The invention claimed is:

1. A tire tread intended to be fitted on heavy vehicles, comprising a plurality of elements in relief, this tread being divided in the axial direction into three parts, a central part and axially on either side a first edge part and a second edge part, the central part of the tread has a width Lc which is determined as the width of the region of the tread the contact patch of which has, in a load condition equal to 0.40 times the E.T.R.T.O. rated load and at E.T.R.T.O. rated pressure, a difference in the maximum length of the contact patch and the minimum length of the contact patch at most equal to 0.5% of the total width W of the contact patch, the first and the second edge parts comprising elements in relief arranged at a pitch Pe corresponding to the average circumference of the edge in question and measured over the median part of said edge at the radially outermost point when the tire is mounted on its rated rim and inflated to its rated pressure divided by the number of elements in relief on the edge in question, the elements in relief of each edge part having a line of leading ridges and a line of trailing ridges, wherein the lines of ridges of the elements in relief of the first edge part have profiles which cannot be superposed on the profiles of the lines of ridges of the elements in relief of the second edge part, be it by central symmetry in the case of a non-directional tread or by axial symmetry in the case of a directional tread, wherein the difference between the absolute value of the angle of the average direction of each line of ridges of an element in relief of the first edge part and each of the absolute values of the angles of the average directions of the lines of ridges of each element in relief of the second edge part is at least equal to 10 degrees and at most equal to 20 degrees, wherein the total contact surface of the elements in relief of the edge parts passing through a window of a circumferential length equal to the pitch Pe of the elements in relief of the edge parts is substantially constant in that the relative deviation between the minimum value and the maximum value of the total surface on the ground is at most 5%, this total contact surface of the elements in relief being equal to the total of the contact surfaces of the elements in relief of the first and second edge parts, and;

wherein the angles of the ridges of the elements in relief of an edge part are equal to or greater than an angle Be by a quantity α (alpha) which may adopt any value between 0 and 20 degrees, whereas the angles of the ridges of the elements in relief of the other edge part are equal to or smaller than the angle Be by a quantity β (beta) which may adopt any value between 0 and 20 degrees, the total of the absolute values of these angles α (alpha) and β (beta) having to be at least equal to 10 degrees and at most equal to 20 degrees, the angle Be being determined by the following relationship:

$$Be = \text{Arctan}\frac{Le}{Pe},$$

where Pe is the pitch of the elements of the edge part in question and Le is the total width in longitudinal projection on the transverse axis of the elements in relief of said part.

2. The tread according to claim 1, wherein the central part comprises a plurality of elements in relief distributed in the circumferential direction with a pitch Pc equal to the circumference measured at the centre of the tire (radially outermost point) divided by the total number of motifs in relief, and wherein the contact surface of the motifs in relief of the central part passing through a window of length equal to the pitch Pc is substantially constant in that the relative deviation between the minimum value and the maximum value of the total surface on the ground is at most 5%.

3. A method for constructing a pattern of elements in relief of a tread which makes it possible substantially to reduce the vibrations during travel which are linked to the great variation in loads in use, this method comprising the steps of:

in the central part of axial width Lc, arranging a plurality of elements in relief with a pitch Pc equal to the circumference divided by the number of elements in relief, each of these elements in relief having lines of leading and trailing ridges which are inclined with the longitudinal direction of the tread by an angle Ac such that the relationship below is satisfied:

$$Ac = \text{Arctan}\left(\frac{Lc}{Pc}\right)$$

in each of the edge parts axially on either side of the central part, arranging a plurality of elements in relief with a pitch Pe equal to the circumference of each edge part divided by the number of elements in relief, each of these elements in relief having lines of leading and trailing ridges which form with the longitudinal direction of the tread an angle De (Ce for the second edge part), such that the following relationships are satisfied:

$$De = \text{Arctan}\left(\frac{Le}{Pe}\right) + \alpha$$

$$Ce = \text{Arctan}\left(\frac{Le}{Pe}\right) + \beta,$$

the values α (alpha) and β (beta) being selected between −20 degrees and +20 degrees (including limits), and such that the total of the absolute values of said angles α and β is at least equal to 10 degrees and at most equal to 20 degrees, wherein Le is the width of each edge part, and wherein the angle De is different than the angle Ce.

* * * * *